(No Model.)
G. F. WHITMORE.
ROTARY PLOW AND PULVERIZER.
No. 502,214. Patented July 25, 1893.
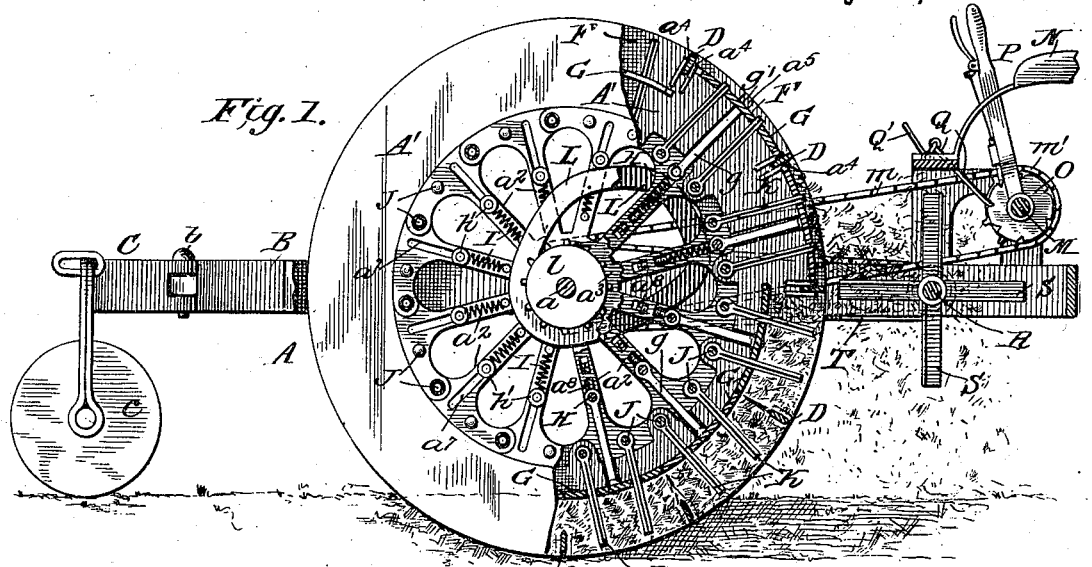
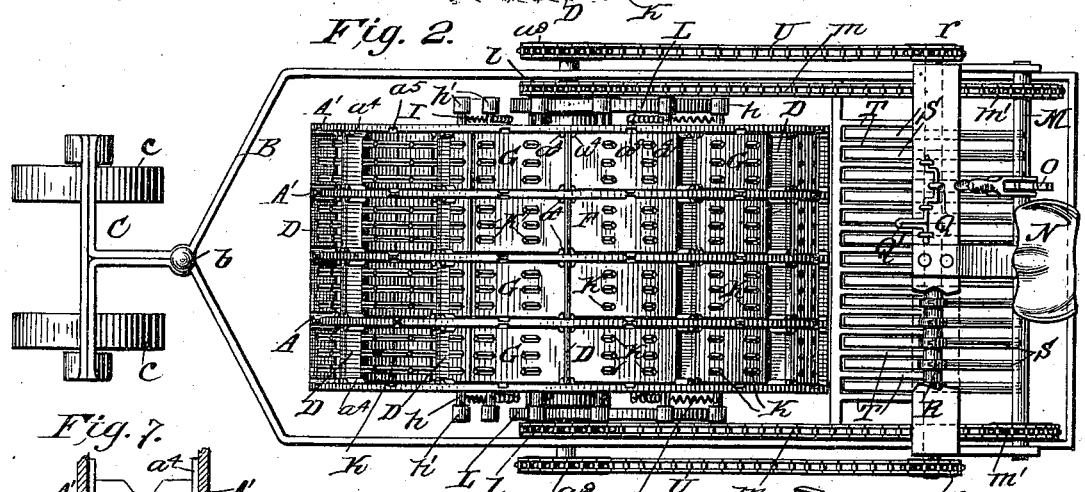
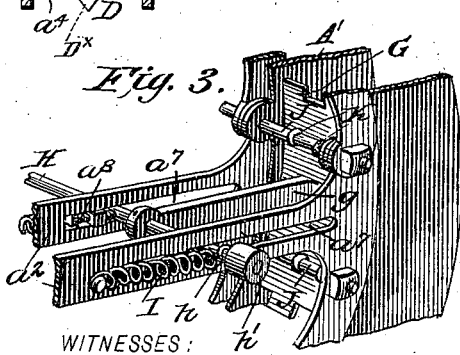
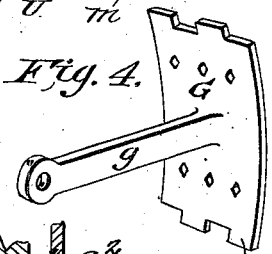
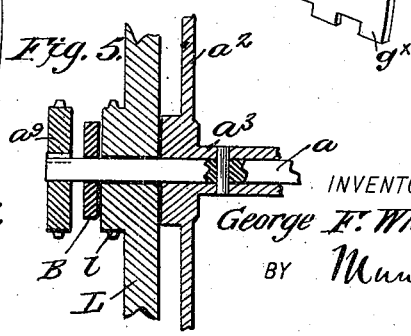
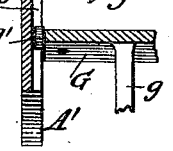
WITNESSES:
Fred G. Dieterich
M. D. Blondel
INVENTOR:
George F. Whitmore.
BY Munn & Co
ATTORNEYS

UNITED STATES PATENT OFFICE.

GEORGE F. WHITMORE, OF WEST UNION, IOWA.

ROTARY PLOW AND PULVERIZER.

SPECIFICATION forming part of Letters Patent No. 502,214, dated July 25, 1893.

Application filed April 18, 1893. Serial No. 470,850. (No model.)

*To all whom it may concern:*

Be it known that I, GEORGE F. WHITMORE, residing at West Union, in the county of Fayette and State of Iowa, have invented a new and Improved Rotary Plow and Pulverizer, of which the following is a specification.

My invention relates to a machine especially adapted for plowing, and pulverizing the ground as it passes thereover, and it has for its object to provide a machine of this character simple in its construction, cheap in its manufacture and effective for its desired purpose.

To these ends my invention consists in a series of colters, connected near their outer edges by a series of radial blades or shovels, whereby to form a series of radially arranged buckets, or compartments in which operate movable pans or followers, which form the bottom of such buckets, and which are automatically reciprocated in such buckets, to discharge the dirt after it has been elevated.

My invention also consists in a pulverizing platform arranged to receive the dirt as it is forced out of the buckets in the colter frame which serves to crush the dirt, and drop it to the rear of such colter frame.

Finally my invention consists in the peculiar combination and novel arrangement of parts, all of which will hereinafter be fully described in the specification and pointed out in the claims, reference being had to the accompanying drawings in which—

Figure 1 is a side elevation partly in section of my digger and pulverizer. Fig. 2 is a top plan view thereof and Figs. 3, 4, 5, 6, and 7 are detail views hereinafter more particularly referred to.

My improved machine comprises a rotatable plow or digger frame A, which is held to rotate on an axle $a$ held in the main or supporting frame B, which frame is of substantially the shape shown in Fig. 2, its front end being joined to form a journal for a pivot bolt $b$, to which the front or guide frame C is pivotally connected, such frame carrying the supporting wheels $c\,c$, as shown.

The digger frame A is formed of a number of colter disks A′, and spokes $a^2\,a^2$ which are connected at their inner ends to the hub portions $a^3$ fixedly held on the shaft $a$. It will be noticed by reference to Figs. 2 and 3 that the several disks A′ are held spaced apart, and between such disks are held a series of shovel blades D which serve as digger blades and also divide the spaces between the disks A′ into a series of dirt compartments F. These blades which in practice are about two and one-half inches wide are fixedly held between radial ribs $a^4\,a^4$ formed on the faces of such disks, and such blades have their inner and outer edges beveled to form cutting edges as shown.

In each compartment F is held a follower G, and each transverse series of followers is connected by rearwardly extending arms $g$ with a transverse shaft H, which extends entirely across the colter frame, and has its ends projected as at $h$ and provided with friction rollers $h'$, which are adapted to engage a cam mechanism hereinafter referred to. The followers are guided between the several colter disks, by the friction rollers and stud arms $g'$ which travel in radial grooves $a^5$ in the sides of such disks as shown, and to provide for a radial movement of the said followers the shafts H are held to travel in slots $a^7$ in the spokes of the colter disks, and such shafts are held drawn normally inward by the springs I.

It will be noticed by reference to Fig. 1 the annular rims of the disks are secured by the transverse bolts J, which pass therethrough at a point to the rear of the followers and on such bolts are secured to project into each pocket F, a series of forks or fingers K, six being employed for each pocket, they projecting through apertures in the followers, and such forks are preferably diamond shape in cross section as shown.

The hubs $a$ of the colter frame are projected at each end, and on such ends are loosely mounted a pair of cams L L of substantially the shape shown in Fig. 1. These cams when adjusted in the position shown are adapted to force the followers G in each pocket successively to their outermost position as each follower reaches a point just above the horizontal axis of the colter frame, and to allow the retractile springs to draw the followers to their innermost position as the pockets successively engage the ground. So far as described it will be observed that when the machine travels forward, as each pocket comes into engagement with the ground, the colter disks and the shovel blades D will cut into the ground, and as the machine travels the blades D and the forks K will assist in lifting the earth to carry it up to the point of discharge. As the several filled pockets or sections of the colter disks reach their rearmost or horizontal position the shafts H of the followers G engage the cams L and are forced outward, to move the followers to their outermost position, whereby to discharge the dirt onto a pulverizing mechanism presently described, and as such followers travel outward they clean the forks and thereby serve to effectually discharge all of the dirt held in each pocket or section.

In practice the followers are arranged to be set to regulate the depth of the cut made by the colters, and to this end, set screws $a^8$ $a^8$ are secured in the base of each of the slots. See Fig. 3.

By providing the blades D with outer and inner cutting edges it will be readily seen that while the front edges will serve to cut into the ground the rear edges will serve to cut roots or twigs as the followers press them up against the said edges.

The cams L are loose on the hubs $a$ and to provide means whereby they can be adjusted from the driver's seat, and set in such a manner that they will force the followers to their outermost positions as the pockets successively strike the ground, whereby to provide for a tread face for the colter when the machine is carried to or from the field, such cams have toothed disks $l\,l$ fixed in their outer face over which pass sprocket chains $m\,m$, which connect at their rear end with sprocket wheels $m'\,m'$ on a shaft M journaled transversely on the main frame under the driver's seat N. On such shaft is fixedly secured a toothed disk O and loosely journaled an operating lever P, which extends up near the driver's seat and has a spring actuated detent for engaging the disk O.

Q indicates a stop pawl adapted to hold the shaft N to any of its adjusted positions which pawl is operated by a foot lever Q' as clearly shown in Fig. 2.

The pulverizing mechanism consists of a shaft R, provided with a series of stirrer blades S, which pass between a series of fingers T projected horizontally rearward from the rear end of the colter frame, and such fingers are at a point just below the horizontal axis of such colter frame. The outer ends of the shaft R have sprocket wheels $r$, over which pass the drive chains U, which connect such wheels with sprocket wheels $a^9$ on the colter shaft.

From the foregoing description taken in connection with the drawings the complete operation, and the advantages of my improved machine will readily appear.

It will be seen that as the machine travels over the ground, the disks cut into the earth, the shovels cut and break it, and serve with the forks and followers to raise it to a point above the pulverizer platform, where it is discharged by the outward movement of the followers, the dirt as it falls onto the pulverizer platform being thoroughly crushed, before it falls back to the ground again.

To the more effectively discharge the dirt, the several followers G may have their ends formed with projecting fingers $g^x$, as shown in Fig. 4, and the fingers of the adjacent ends of each pair of followers are so arranged as to intermesh when they are drawn inward.

In some kinds of soil such as heavy stalk fields, where straight edge cutters would encounter a great amount of resistance in penetrating the ground, I find it preferable to form the cutters with penetrating points $D^x$ as shown in Fig. 7.

Having thus described my invention, what I claim, and desire to secure by Letters Patent, is—

1. In a combined digger and pulverizer, in combination, a main frame, a digger frame held to rotate thereon, said frame formed of a plurality of disks, radial blades connecting them at their outer ends, whereby to form dirt holding portions, radially movable followers operating between such blades, and a cam mechanism for moving such followers outward at predetermined points, all substantially as and for the purposes described.

2. In a machine as described, in combination, a main frame, a disk frame, said disk frame having a series of radial pockets and cutter plates, reciprocating followers operating in such pockets, a pulverizer frame comprising a comb plate and stirring fingers rotating between the comb fingers, said frame arranged to receive the dirt as it is discharged from the disk frame, and means for reciprocating the followers, substantially as described.

3. In combination, the disks A', the shovel blades D, having cutting edges on their inner and outer edges, the followers G, and means for reciprocating the followers between the shovel blades D substantially as shown and described.

4. In a combined digger and pulverizing machine, the combination with the disks A', the shovel blades D and the followers arranged substantially as shown, of the forked fingers extended through the followers into the spaces between the shovel blades as and for the purposes described.

5. In a machine substantially as described, the combination, with the main frame, the cams adjustably held thereon, the disks held to rotate on the frame B, having spokes formed with elongated slots, and the shovel blades D, of followers held to reciprocate between the shovels, said followers having rearwardly extending shanks, transverse rods seated in the said slots, and connecting the follower shanks, such rods adapted to engage the cams and spring devices for holding the rods to their normal position substantially as and for the purpose described.

6. The combination of a series of colter disks having radial plates or shovels at their outer edges, followers operating between such shovels, forked arms extended outward through such followers and a cam and spring mechanism for reciprocating such followers all substantially as and for the purposes described.

7. The combination of a series of colter disks having radial plates or shovels at their outer edges, followers operating between such shovels, forked arms extended outward through such followers, spring devices for normally drawing the followers to their inner position adjustable cams loosely mounted on the colter shaft, adapted to force the followers to their outer positions, and lever mechanism arranged to be operated from the driver's seat, for adjusting such cams, all substantially as and for the purpose described.

GEORGE F. WHITMORE.

Witnesses:
D. O. SMITH,
FRED D. MERRITT.